US012745265B2

(12) United States Patent
Choi et al.

(10) Patent No.: US 12,745,265 B2
(45) Date of Patent: Sep. 22, 2026

(54) METHOD, TERMINAL, DEVICE, AND STORAGE MEDIUM FOR MONITORING CONTROL CHANNEL, AND METHOD AND BASE STATION FOR TRANSMITTING CONTROL CHANNEL

(71) Applicant: LG ELECTRONICS INC., Seoul (KR)

(72) Inventors: Seunghwan Choi, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 18/726,260

(22) PCT Filed: Jan. 6, 2023

(86) PCT No.: PCT/KR2023/000281

§ 371 (c)(1),
(2) Date: Jul. 2, 2024

(87) PCT Pub. No.: WO2023/132682

PCT Pub. Date: Jul. 13, 2023

(65) Prior Publication Data

US 2025/0081202 A1 Mar. 6, 2025

(30) Foreign Application Priority Data

Jan. 7, 2022 (KR) ........................ 10-2022-0002936

(51) Int. Cl.
*H04W 8/22* (2009.01)
*H04W 72/0446* (2023.01)
*H04W 72/231* (2023.01)
*H04W 72/232* (2023.01)
*H04W 72/51* (2023.01)
(Continued)

(52) U.S. Cl.
CPC ........... *H04W 72/232* (2023.01); *H04W 8/22* (2013.01); *H04W 72/0446* (2013.01); *H04W 72/231* (2023.01); *H04W 72/51* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ....... H04L 5/00–0098; H04L 27/2602–26136; H04W 8/22–245; H04W 72/02–569; H04W 84/02–16; H04W 88/02–12; H04W 92/02–04; H04W 92/10
See application file for complete search history.

(56) References Cited

U.S. PATENT DOCUMENTS

2020/0389874 A1 12/2020 Lin et al.

OTHER PUBLICATIONS

Samsung, "PDCCH monitoring enhancements for NR from 52.6 GHz to 71 Ghz," 3GPP TSG RAN WG1 #106bis, R1-2109477, 8 pages, Oct. 2021 (Year: 2021).*

(Continued)

*Primary Examiner* — Timothy J Weidner
(74) *Attorney, Agent, or Firm* — BRYAN CAVE LEIGHTON PAISNER LLP

(57) ABSTRACT

A method and device for monitoring a control channel in a wireless communication system disclosed herein perform PDCCH monitoring within a BD/CCE limit. The BD/CCE limit is computed per unit time in which the PDCCH monitoring is performed.

11 Claims, 10 Drawing Sheets

(51) Int. Cl.

| | |
|---|---|
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(56) References Cited

OTHER PUBLICATIONS

NTT Docomo, Inc. "PDCCH monitoring enhancements for NR from 52.6 to 71 GHZ, " 3GPP TSG RAN WG1 Meeting #107-e, R1-2112097, 11 pages, Nov. 2021 (Year: 2021).*

Samsung, "PDCCH monitoring enhancements for NR from 52.6 GHz to 71 Ghz," 3GPP TSG RAN WG1 #106bis, R1-2109477, 8 pages, Oct. 2021.

NTT Docomo, Inc. "PDCCH monitoring enhancements for NR from 52.6 to 71 Ghz," 3GPP TSG RAN WG1 Meeting #107-e, R1-2112097, 11 pages, Nov. 2021.

LG Electronics, "PDCCH monitoring enhancements to support NR above 52.6 Ghz," 3GPP TSG RAN WG1 #107-e, R1-2112046, 11 pages, Nov. 2021.

Qualcomm Incorporated, "PDCCH monitoring enhancements," 3GPP TSG-RAN WG1 #107-e, R1-2112204, 8 pages, Nov. 2021.

* cited by examiner

FIG. 4

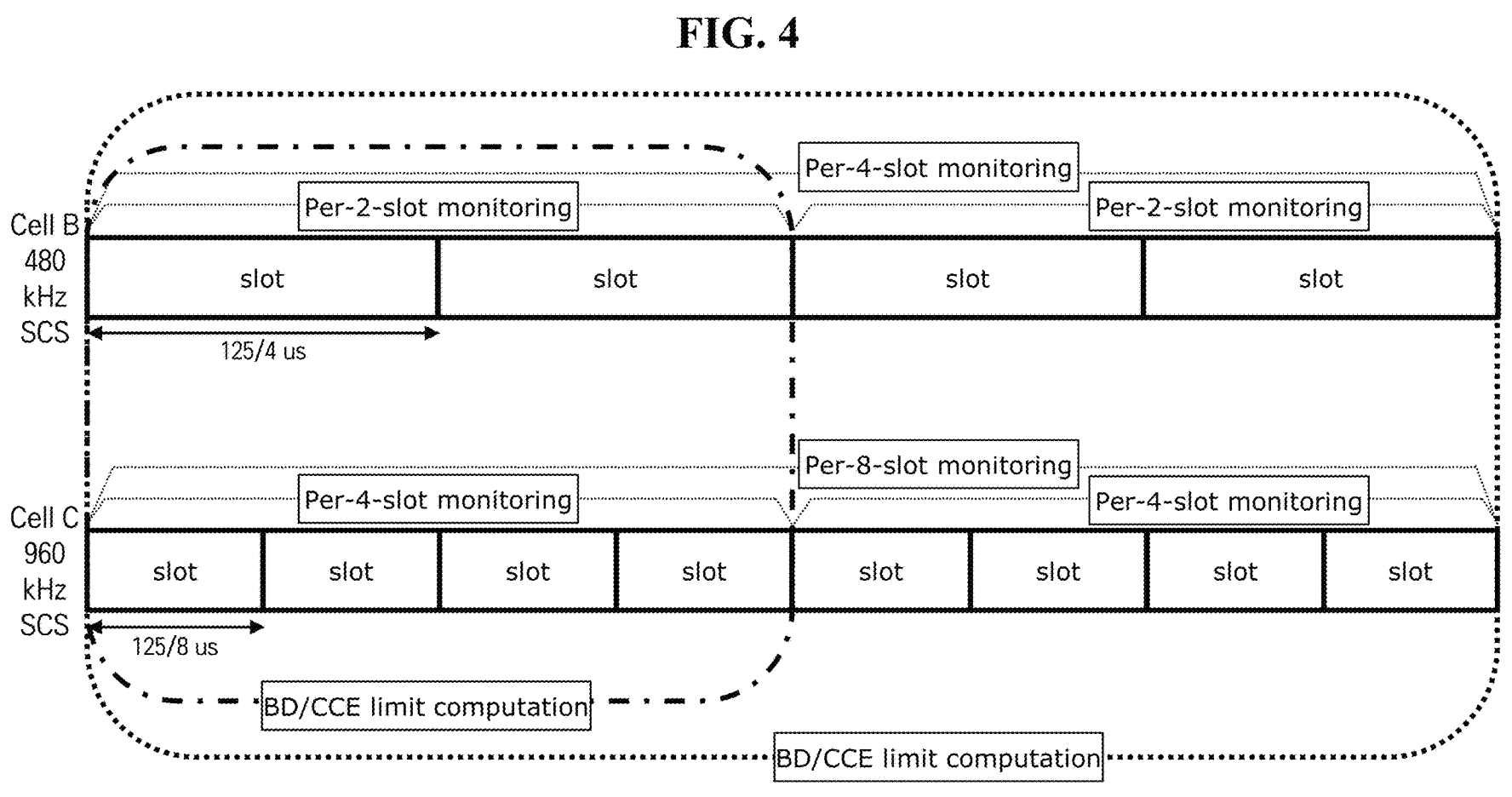

Cell B
480
kHz
SCS
Cell C
960
kHz
SCS
Per-2-slot monitoring
Per-2-slot monitoring
Per-4-slot monitoring
slot
slot
slot
slot
125/4 us
Per-4-slot monitoring
Per-4-slot monitoring
Per-8-slot monitoring
slot
slot
slot
slot
slot
slot
slot
slot
125/8 us
BD/CCE limit computation
BD/CCE limit computation Cell A 120 kHz SCS
Per-slot monitoring
slot
125 us
Cell B 480 kHz SCS
Per-4-slot monitoring
Per-2-slot monitoring
Per-2-slot monitoring
slot
slot
slot
slot
125/4 us
Cell C 960 kHz SCS
Per-8-slot monitoring
Per-4-slot monitoring
Per-4-slot monitoring
slot
slot
slot
slot
slot
slot
slot
slot
125/8 us
BD/CCE limit computation
BD/CCE limit computation

FIG. 9

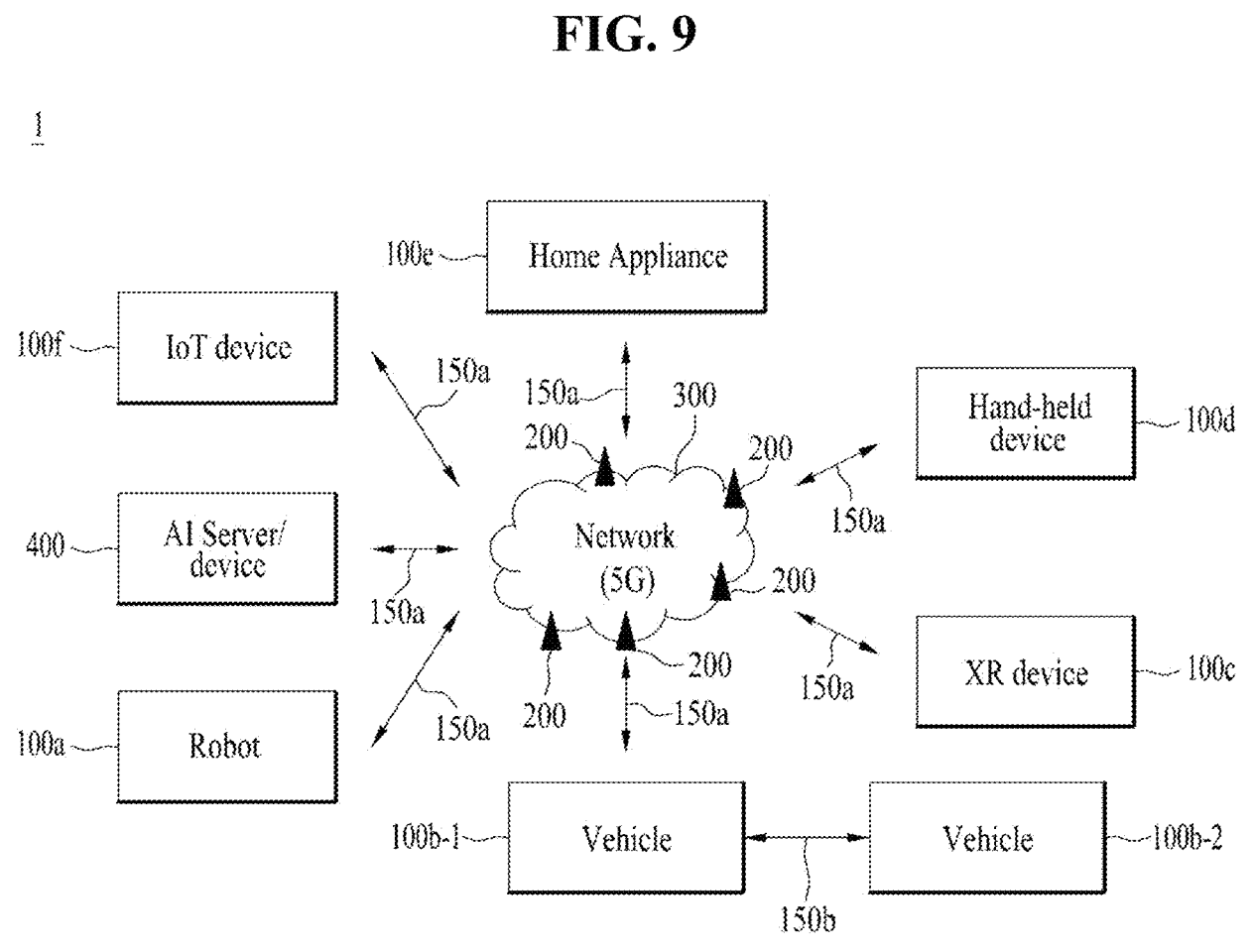

1
Robot 100a
Vehicle 100b-1
Vehicle 100b-2
XR device 100c
Hand-held device 100d
Home Appliance 100e
IoT device 100f
AI Server/device 400
Network (5G) 300
200
150a
150b

FIG. 12

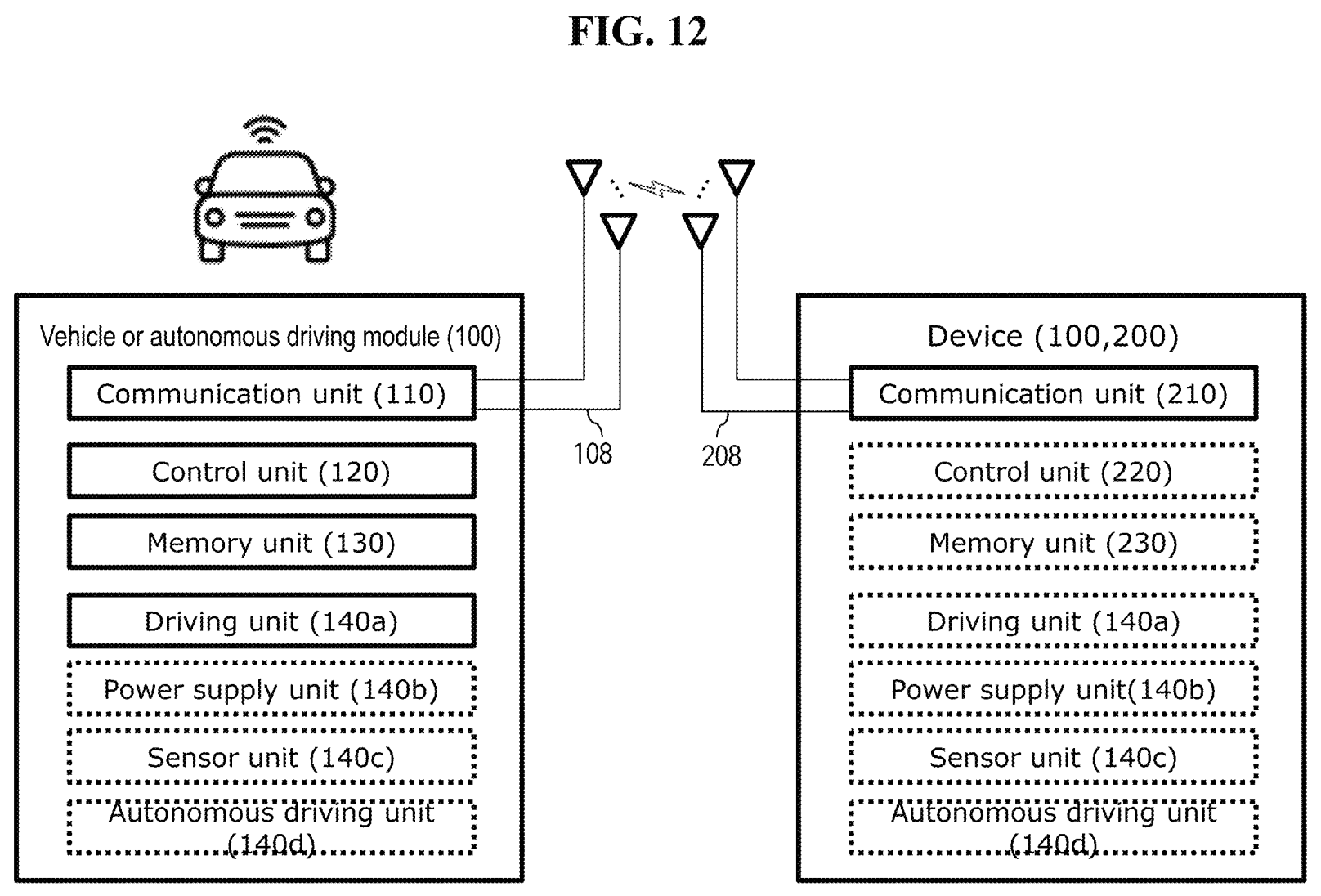

Vehicle or autonomous driving module (100)
Communication unit (110)
Control unit (120)
Memory unit (130)
Driving unit (140a)
Power supply unit (140b)
Sensor unit (140c)
Autonomous driving unit (140d)

108

208

Device (100,200)
Communication unit (210)
Control unit (220)
Memory unit (230)
Driving unit (140a)
Power supply unit(140b)
Sensor unit (140c)
Autonomous driving unit (140d)

METHOD, TERMINAL, DEVICE, AND STORAGE MEDIUM FOR MONITORING CONTROL CHANNEL, AND METHOD AND BASE STATION FOR TRANSMITTING CONTROL CHANNEL

CROSS-REFERENCE TO RELATED APPLICATIONS

This application is a National Phase application under 35 U.S.C. 371 of International Application No. PCT/KR2023/000281, filed on Jan. 6, 2023, which claims the benefit of Korean Application No. 10-2022-0002936, filed on Jan. 7, 2022, the contents of which are incorporated by reference herein in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

A technical object of the present disclosure is to provide a signal monitoring method for effectively performing monitoring of a control channel in a wireless communication system, and an apparatus therefor.

The technical problem of the present disclosure is not limited to the above-described technical problem, and other technical problems may be derived from the embodiments of the present disclosure.

A method of monitoring a control channel by a UE in a wireless communication system is provided.

According to another aspect of the present disclosure, a UE for monitoring a control channel in a wireless communication system is provided. The UE includes at least one transceiver, at least one processor, and at least one computer memory operably connected to the at least one processor and configured to store instructions that when executed causes the at least one processor to perform operations.

According to another aspect of the present disclosure, an apparatus for the UE is provided. The apparatus includes at least one processor, and at least one computer memory operably connected to the at least one processor and configured to store instructions that when executed causes the at least one processor to perform operations.

According to another aspect of the present disclosure, a computer-readable non-transitory storage medium containing at least one computer program for causing at least one processor to perform operations is provided.

According to another aspect of the present disclosure, a method of transmitting a control channel by a BS in a wireless communication system is provided.

According to another aspect of the present disclosure, a BS for transmitting a control channel in a wireless communication system is provided.

The method by the UE, or the operations performed by execution of instruction(s) stored in at least one memory or a storage medium of the UE or the apparatus for the UE may include: receiving search space configurations for a plurality of downlink (DL) cells including a first set of DL cells; and performing physical downlink control channel (PDCCH) monitoring on the plurality of DL cells based on the search space configurations. Each of the first set of DL cells includes a search space with a multi-slot PDCCH monitoring-related configuration. The PDCCH monitoring is performed in units of slot-groups for a search space with an associated multi-slot PDCCH monitoring-related configuration. The PDCCH monitoring is performed within M PDCCH candidates and C non-overlapping control channel elements (CCEs) on the plurality of DL cells.

The method by the BS, or the operations performed by execution of instruction(s) stored in at least one memory of the BS include: transmitting search space configurations for a plurality of downlink (DL) cells including a first set of DL cells to a user equipment (UE); and transmitting at least one physical downlink control channel (PDCCH) to the UE on the plurality of DL cells based on the search space configurations. Each of the first set of DL cells includes a search space with a multi-slot PDCCH monitoring-related configuration. The at least one PDCCH is transmitted in units of slot-groups for a search space with an associated multi-slot PDCCH monitoring-related configuration. The at least one PDCCH is transmitted within M PDCCH candidates and C non-overlapping control channel elements (CCEs) on the plurality of DL cells.

In each aspect of the present disclosure, M and C may be computed for each time unit in which the PDCCH monitoring is performed.

In each aspect of the present disclosure, M and C may be computed for each time unit for the first set of DL cells excluding a second set of DL cells with no associated multi-slot PDCCH monitoring-related configuration among the plurality of DL cells.

In each aspect of the present disclosure, M and C may be computed for each time unit for the plurality of DL cells including a second set of DL cells with no associated multi-slot PDCCH monitoring-related configuration.

In each aspect of the present disclosure, M and C may be computed based on the number of DL cells on which the UE is configured to perform monitoring exceeding a total number of DL cells on which the UE is capable of performing monitoring.

In each aspect of the present disclosure, the multi-slot PDCCH monitoring-related configuration may be provided for a cell with a subcarrier spacing (SCS) of 480 kHz or a cell with an SCS of 960 kHz.

The above devices may include an autonomous driving vehicle configured to communicate at least with a UE, a network, and other autonomous driving vehicles other than the devices.

The aspects of the disclosure are only a part of the preferred embodiments of the disclosure, and various embodiments based on technical features of the disclosure may be devised and understood by the person with ordinary skill in the art based on the detailed description of the disclosure.

According to an embodiment of the disclosure, a UE may perform control signal monitoring more efficiently.

The technical effects of the present disclosure are not limited to the above-mentioned technical effects, and other technical effects may be derived from the embodiments of the present disclosure.

BRIEF DESCRIPTION OF THE DRAWINGS

FIGS. 4 to 6 are diagrams for explaining a blind decoding (BD) and/or control channel element (CCE) limit according to some implementations of the present disclosure.

FIGS. 7 and 9 are flowcharts of signal transmission and reception methods according to an embodiment of the present disclosure.

FIG. 9 illustrates a communication system 1 applied to the present disclosure.

FIG. 12 illustrates a vehicle or an autonomous driving vehicle applied to the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
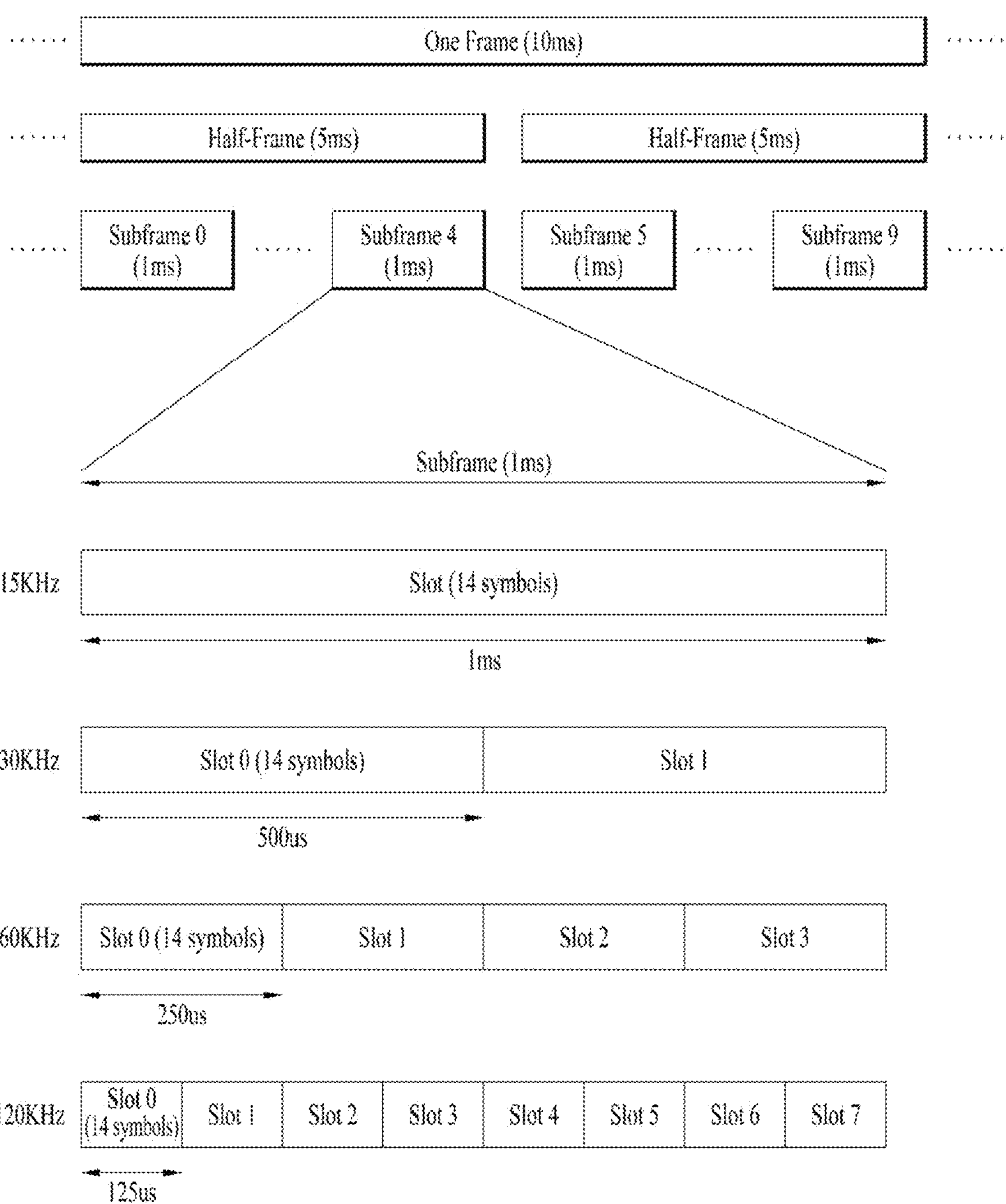
FIG. 1 illustrates a radio frame structure.

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM (A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to SCSs in an extended CP case.

TABLE 2

| SCS (15*2^u) | $N_{symb}^{slot}$ | $N_{slot}^{frame,u}$ | $N_{subframe,u}^{slot}$ |
|---|---|---|---|
| 60 KHz (u = 2) | 12 | 40 | 4 |

In the NR system, different OFDM (A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

NR may support various numerologies (or subcarrier spacings (SCSs)) to provide various 5G services. For example, NR may support a wide area in conventional cellular bands for an SCS of 15 kHz and support a dense urban area and a wide carrier bandwidth with lower latency for an SCS of 30 or 60 kHz. For an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table A6 below. FR 2 may mean a millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
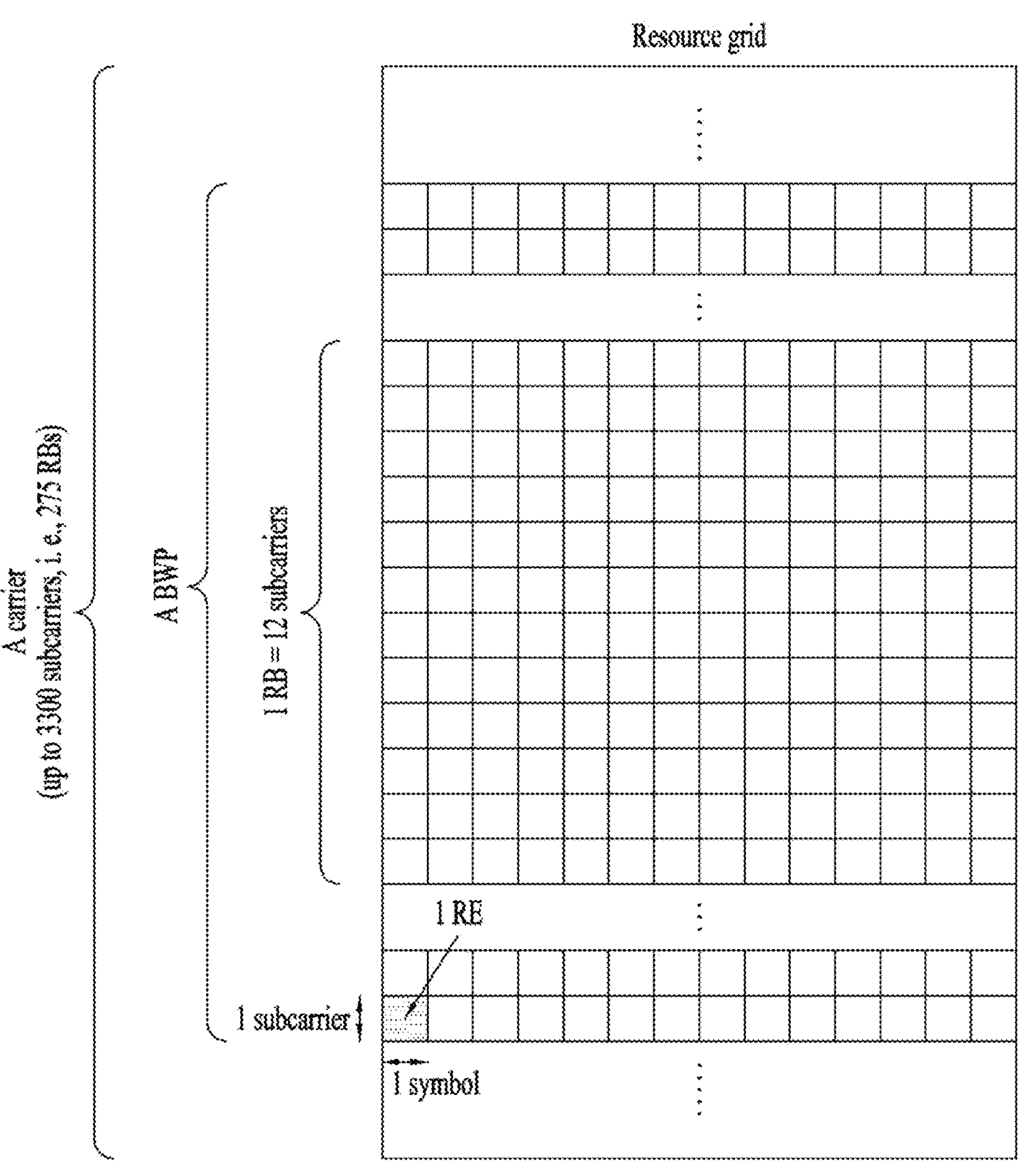
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
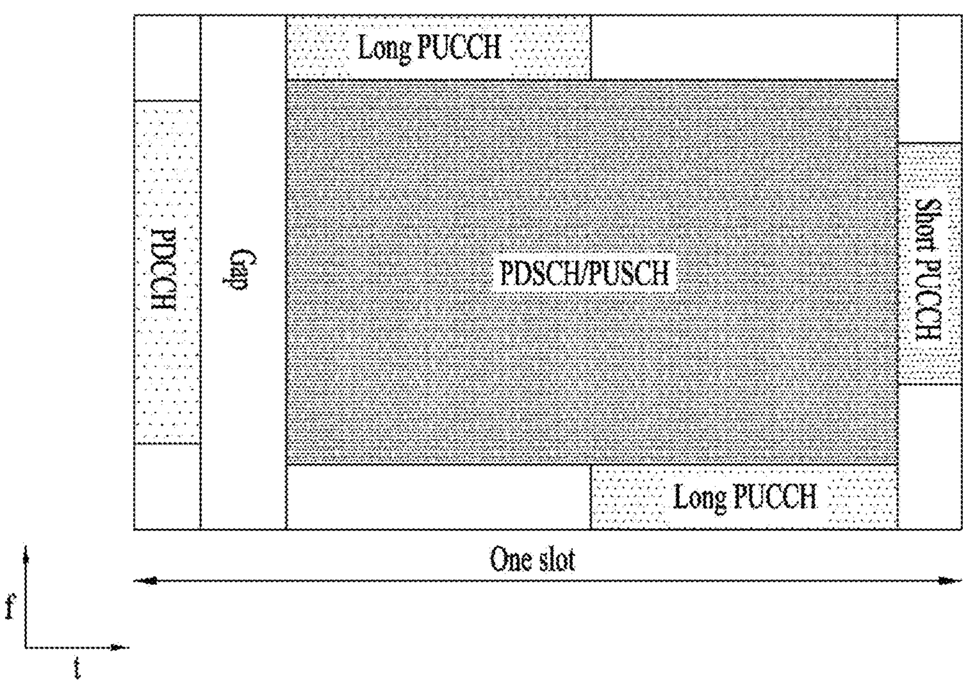
FIG. 3 shows an example in which a physical channel is mapped in a slot.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH: frequency/time resource allocation information on an uplink shared channel (UL-SCH): paging information on a paging channel (PCH): system information on a DL-SCH: time/frequency resource allocation information on a higher layer control message such as a random access response (RAR) transmitted over a PDSCH: transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS (Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configured Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC (Transmit Power Control)-PUCCH-RNTI | PUCCH power control | N/A |
| TPC-PUSCH-RNTI | PUSCH power control | N/A |
| TPC-SRS-RNTI | SRS triggered and power control | N/A |
| INT(Interruption)-RNTI | Indication pre-emption in DL | N/A |

TABLE 5-continued

| RNTI | Usage | Transport Channel |
|---|---|---|
| SFI(Slot Format Indication)-RNTI | Slot Format Indication on the given cell | N/A |
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P) RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

controlResourceSetId: this parameter/information indicates the identifier (ID) of the CORESET.

frequency DomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.

duration: this parameter/information indicates time-domain resources of the CORESET. The parameter/information duration may indicate the number of consecutive OFDMA symbols included in the CORESET. For example, duration has a value of 1-3.

cce-REG-MappingType: this parameter/information indicates a CCE-to-REG mapping type. An interleaved type and a non-interleaved type may be supported.

precoderGranularity: this parameter/information indicates a precoder granularity in the frequency domain.

tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.

tci-PresentInDCI: this parameter/information indicates whether a TCI field is included in DCI.

pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces

TABLE 6

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-P UCCH-RNTI, TPC-SRS-RNTI, C-RNTI, MCS-C-RNTI ,or CS-RNTI | Group signaling |
| UE Specific | UE Specific | C-RNTI, MCS-C-RNTI, or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: this parameter/information indicates the ID of the SS set.

controlResourceSetId: this parameter/information indicates the CORESET associated with the SS set.

monitoringSlotPeriodicityAndOffset: this parameter/information indicates a PDCCH monitoring periodicity (in a unit of slot) and a PDCCH monitoring offset (in a unit of slot)

monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpace Type: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

In the present disclosure, a scheduling cell refers to a cell through which a PDCCH is transmitted or a cell in which a UE performs PDCCH monitoring, and a scheduled cell refers to a cell to which PUSCH/PDSCH resource(s) is allocated/to be allocated by DCI carried by a PDCCH. When cross-carrier scheduling is configured for a serving cell, which cell signals downlink assignments and uplink grants for the serving cell, that is, which cell is a scheduling cell for the serving cell may be configured to the UE. DCI including resource allocation information for the PUSCH/PDSCH may include information about which cell the resource allocation information is for, that is, which cell is a cell scheduled by the DCI. The serving cell through which the PDCCH is transmitted may be a cell on which it is scheduled.

1. Control Channel Monitoring in High Frequency Band

The above description may be applied in combination with the methods proposed in the present disclosure to be described later, or may be supplemented to clarify the technical characteristics of the methods proposed in the present disclosure.

In addition, the methods to be described later may be equally applied to the above-described NR system (licensed band) or shared spectrum, and may be modified or replaced to fit the terms, expressions, structures, and the like defined in each system to implement the technical idea proposed in the present disclosure in the corresponding system.

In a NR system, multiple numerologies (or subcarrier spacing (SCS)) are supported to support a variety of 5G services. For example, a wide area in typical cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more. An NR frequency band up to Release 16 may be defined as two types of frequency ranges (FR1 and FR2) and may be configured as shown in Table 3. In addition, discussions are going on to support future NR systems in a frequency band defined in FR1/FR2 or higher (e.g., 52.6 GHz to 71 GHZ).

A higher frequency band than FR1 and FR2 bands (e.g., 52.6 GHz to 114.25 GHz band, particularly 52.6 GHz to 71 GHZ) may be referred to as FR2-2. Waveforms, SCS, CP length, timing, etc. defined for FR1 and FR2 in the existing NR system may not be applied to FR2-2.

SCS of 120 kHz, 480 kHz, and 960 kHz may be used for an operation of the NR in an FR2-2 band. In the case of SCS of 480 kHz and 960 kHz, the length of an OFDM symbol may be shorter than that of 120 kHz. For example, an OFDM symbol of 480 kHz is ¼ the length of an OFDM symbol of 120 kHz, and an OFDM symbol of 960 kHz is ⅛ times of the length of an OFDM symbol of 120 kHz. For a short-length slot to which 480 kHz and 960 kHz are applied, when a PDCCH monitoring operation is performed in all slots, the UE may have a burden such as power consumption. Therefore, when SCS of 480 kHz and/or 960 kHz is configured, multi-slot PDCCH monitoring may be introduced.

In a 3GPP NR-based system, a BS may configure one or multiple CORESETs for the UE through RRC signaling, configure one or more SS sets, and also configure the number of PDCCH candidates per PDCCH aggregation level (AL) for each SS set. In the 3GPP NR-based system, the maximum number of PDCCH candidates that the BS may configure for the UE for a predetermined time interval is not fixed. The number of PDCCH candidates also increases according to the number of serving cells configured for the UE. If the UE needs to monitor a large number of PDCCH candidates for a predetermined time interval, i.e., if the number of blind decoding (BD) processes that the UE needs to perform for a predetermined time interval is too large, the complexity of PDCCH decoding in the UE increases and the complexity of HARQ process management increases. In addition, in some scenarios, in order to decode a PDCCH, the UE performs channel estimation on a control channel element (CCE) basis based on a reference signal transmitted along with the PDCCH. A capability of the UE to monitor the PDCCH for each predetermined time interval depends not only on the maximum number of PDCCH candidates that the UE may monitor for each predetermined time interval but also on the number of CCEs in which the UE may perform channel estimation for each predetermined time interval. Here, the number of CCEs in which the UE needs to perform channel estimation for the predetermined time interval may mean the number of non-overlapping CCEs. This is because, for overlapping CCEs, the UE may reuse, for other CCEs, a channel estimation result for one CCE. If CCEs for PDCCH candidates correspond to different CORESET indexes or different first symbols for reception of respective PDCCH candidates, the CCEs for the PDCCH candidates are non-overlapping CCEs.

If the BS transmits PDCCHs to the UE using PDCCH candidates and/or non-overlapping CCEs that exceed the capability of the UE, the UE may not properly detect some or all of the PDCCHs. Additionally, if the BS is not aware of the maximum number of PDCCH candidates and the maximum number of non-overlapping CCEs to be used by the BS in the predetermined time interval, the UE will perform PDCCH monitoring in each predetermined time interval up to a maximum capability limit of the UE, thereby wasting UE power.

To solve these issues, BD/CCE limits are defined or determined/computed in some scenarios (e.g., 3GPP-based system).

Multi-slot PDCCH monitoring refers to an operation of performing PDCCH monitoring by determining blind decoding (BD)/control channel element (CCE) limits based on a plurality of consecutive slots and/or on a basis of a plurality of consecutive slots. In the conventional NR rel-15, BD/CCE limits may be determined in units of one slot, and in NR rel-16, BD/CCE limits may be determined in units of spans confined within one slot. The span may mean a PDCCH monitoring unit including consecutive symbols.

Hereinafter, PDCCH monitoring performed in units of slots may be expressed as per-slot monitoring, PDCCH monitoring performed in units of spans may be expressed as per-span monitoring, and PDCCH monitoring performed in units of slots-groups may be expressed as per-X monitoring.

In the present disclosure, BD limits may refer to "Maximum number of monitored PDCCH candidates for a DL BWP with SCS configuration for a single serving cell" on the 3GPP standard, and CCE limits refer to "Maximum number of non-overlapped CCEs for a DL BWP with SCS configuration for a single serving cell" on the 3GPP standard.

A plurality of consecutive slots, which are a reference of multi-slot PDCCH monitoring, is referred to as a slot-group. A slot-group may include X consecutive slots, and BD/CCE limits may be defined in units of slot-groups. For example, for SCS of 480 kHz, BD/CCE limit per slot-group including X=4 slots may be defined. In addition, another specific number (referred to as Y) of consecutive slots may be defined within a slot-group, and the UE and BS may operate so that PDCCH monitoring is limited only within Y slots depending on types of SS sets.

In addition, PDCCH monitoring may be performed only in specific consecutive Y slots within a slot-group including X consecutive slots, and PDCCH monitoring may not be performed in slots other than the Y slots among the X slots.

A PDCCH corresponding to a specific SS set type may be monitored only in Y slots, and a PDCCH corresponding to another SS set type may be monitored in X slots.

PDCCH monitoring in the UE is performed in units of SS sets. An SS set includes a CSS set and a USS set. The CSS set may include a Type0-PDCCH CSS set, a Type OA-PDCCH CSS set, a Type1-PDCCH CSS set provided by dedicated higher layer signaling, a Type1-PDCCH CSS set provided in SIB1, a Type2-PDCCH CSS set, and a Type3-PDCCH CSS set.

Meanwhile, a UE supporting carrier aggregation (CA) may report the number of DL cells on which the UE is capable of performing BD/CCE as specified in 3GPP TS 38.213 (indicated as $N^{cap}_{cells}$, etc. in the specification, hereinafter referred to as N_cap) to the BS through a UE capability signal pdcch-BlindDetectionCA. Additionally, the UE may receive, from the BS, the number of DL serving cells on which the UE will monitor the PDCCH (indicated as $N^{DL}_{cells}$, $N^{DL}_{cells,0}$, or $N^{DL}_{cells,1}$, etc. in the specification, hereinafter referred to as N_dl). In this disclosure, the specification may refer to technical content disclosed in conventional 3GPP documents. The following table is an excerpt from Clause 10 of 3GPP TS 38.213.

TABLE 7

| |
|---|
| if a UE can support |
| a first set of $N^{DL}_{cells,0}$ |
| serving cells where the UE is either not provided |
| coresetPoolIndex or is provided coresetPoolIndex with a single value for all CORESETs on all DL BWPs of each scheduling cell from the first set of serving cells, and |
| a second set of $N^{DL}_{cells,1}$ |
| serving cells where the UE is either not provided |
| coresetPoolIndex or is provided coresetPoolIndex with a value 0 for a first CORESET, and with a value 1 for a second CORESET on any DL BWP of each scheduling cell from the second set of serving cells |
| the UE determines, for the purpose of reporting pdcch-BlindDetectionCA, a number of |
| serving cells as $N^{DL}_{cells,0} + R \cdot N^{DL}_{cells,1}$ |
| where R is a value reported by the UE. |

TABLE 7-continued

| |
|---|
| If a UE indicates in UE-NR-Capability a carrier aggregation capability larger than 4 serving cells and the UE is not provided monitoringCapabilityConfig for any downlink cell or if the UEs is provided monitoringCapabilityConfig = r15monitoringcapability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells. When a UE is not configured for NR-DC operation, the UE determines a capability to monitor a maximum number of PDCCH candidates and a maximum number of PDCCH candidates and a maximum number of non-overlapped CCEs per slot that corresponds to $N_{cells}^{cap}$ downlink cells, where $N_{cells}^{cap}$ is $N_{cells,0}^{DL} + R \cdot N_{cells,1}^{DL}$ if the UE does not provide pdcch-BlindDetectionCA where $N_{cells,0}^{DL} + N_{cells,1}^{DL}$ is the number of configured downlink serving cells otherwise, $N_{cells}^{cap}$ is the value of pdcch-BLindDetectionCA |

When N_dl<=N_cap, the UE may perform PDCCH monitoring for each cell up to a BD/CCE limit configured for each serving cell. However, when N_dl>N_cap, if the UE performs PDCCH monitoring for each cell up to the BD/CCE limit configured for each serving cell, a PDCCH monitoring capability (i.e., N_cap) reported by the UE will be exceeded. Therefore, the UE may recompute (or change/restrict) the BD/CCE limit for each cell (and/or each SCS) according to a predetermined rule. Hereinafter, for convenience of explanation, this is simply referred to as BD/CCE limit computation.

In some scenarios, for example, NR Rel-16 may support the following three different methods depending on a PDCCH monitoring method configured for the UE for BD/CCE limit computation (or change/restriction) when N_cap<N_dl.

(Case-1) When only per-slot monitoring is configured for all cell(s) configured for the UE, the UE operates as follows depending on a situation in which N_dl<=N_cap or N_dl>N_cap using $N^{cap}_{cells}$ which may be determined based on the UE capability signal pdcch-BlindDetectionCA. The following table is an excerpt from Clause 10.1 of 3GPP TS 38.213. For reference, an SCS configuration u in the disclosure is used to denote an SCS configuration u in the standard specification. That is, the symbol "u" in the standard specification is denoted as "u" in the disclosure, and the symbol "u" and the symbol "u" in the disclosure are used interchangeably.

TABLE 8

Table 10.1-2: Maximum number $M_{PDCCH}^{max,slot,\mu}$ of monitored PDDCH candidates per slot for a DL BWP with SCS configuration $\mu \in \{0, 1, 2, 3\}$ for a single serving cell

| μ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |
| | . . . |

CCEs for PDCCH candidates are non-overlapped if they correspond to
- different CORESET indexes, or
- different first symbols for the reception of the respective PDCCH candidates.

. . .

TABLE 8-continued

Table 10.1-3: Maximum number $C_{PDCCH}^{max,slot,\mu}$ of non−overlapped CCEs per slot for a DL BWP with SCS configuration $\mu \in \{0, 1, 2, 3\}$ for a single serving cell

| μ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

If a UE
does not report pdcch-BlindDetectionCA or is not provided BDFactorR, $\gamma = R$
reports pdcch-BlindDetectionCA, the UE can be indicated by BDFactorR either $\gamma = 1$ or $\gamma = R$ If a UE is configured with $N_{cells,0}^{DL,\mu} + N_{cells,1}^{DL,\mu}$ downlink cells for which the UE is not provided monitoringCapabilityConfig-r16, or is provided monitoringCapabilityConfig-r16 = r15monitoringcapability but not provided CORESETPoolIndex, with associated PDCCH candidates monitored in the active DL BWPs of the scheduling cells using SCS configuration μ where $\sum_{\mu=0}^{3}(N_{cells,0}^{DL,\mu} + \gamma \cdot N_{cells,1}^{DL,\mu}) \le N_{cells}^{cap}$, the UE is not required to monitor, on the active DL BWPs of the scheduling cells, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell when the scheduling cell is from the $N_{cells,0}^{DL,\mu}$ downlink cells, or more than $M_{PDCCH}^{total,slot,\mu} = \gamma \cdot M_{PDCCH}^{max,slot,\mu}$ PDCCH candidates or more than $C_{PDCCH}^{total,slot,\mu} = \gamma \cdot C_{PDCCH}^{max,slot,\mu}$ non-overlapped CCEs per slot for each scheduled cell when the scheduling cell is from the $N_{cells,1}^{DL,\mu}$ downlink cells

- more than $M_{PDCCH}^{max,slot,\mu}$ PDCCH candidates or more than $C_{PDCCH}^{max,slot,\mu}$ non-overlapped CCEs per slot for CORESETs with same coresetPoolIndex value for each scheduled cell when the scheduling cell is from the $N_{cells,1}^{DL,\mu}$ downlink cells If a UE is configured with $N_{cells,0}^{DL,\mu} + N_{cells,1}^{DL,\mu}$ downlink cells for which the UE is not provided monitoringCapabilityConfig, or is provided monitoringCapabilityConfig-r16 = r15monitoringcapability but not provided coresetPoolIndex, TABLE 8-continued

| |
|---|
| with associated PDCCH candidates monitored in the active DL BWPs of the scheduling cell(s) using SCS configuration μ, where $\sum_{\mu=0}^{3}(N_{cells,0}^{DL,\mu} + \gamma \cdot N_{cells,1}^{DL,\mu}) > N_{cells}^{cap}$, and |
| - a DL BWP of an activated cell is the active DL BWP of the activated cell, and a DL BWP of a deactivated cell is the DL BWP with index provided by firstActiveDownlinkBWP-Id for the deactivated cell, |
| the UE is not required to monitor more than $M_{PDCCH}^{total,slot,\mu} = \left\lfloor N_{cells}^{cap} \cdot M_{PDCCH}^{max,slot,\mu} \cdot (N_{cells,0}^{DL,\mu} + \gamma \cdot N_{cells,1}^{DL,\mu}) / \sum_{j=0}^{3}(N_{cells,0}^{DL,j} + \gamma \cdot N_{cells,1}^{DL,j}) \right\rfloor$ PDCCH candidates or more than $C_{PDCCH}^{total,slot,\mu} = \left\lfloor N_{cells}^{cap} \cdot C_{PDCCH}^{max,slot,\mu} \cdot (N_{cells,0}^{DL,\mu} + \gamma \cdot N_{cells,1}^{DL,\mu}) / \sum_{j=0}^{3}(N_{cells,0}^{DL,j} + \gamma \cdot N_{cells,1}^{DL,j}) \right\rfloor$ non-overlapped CCEs per slot on the active DL BWP(s) of scheduling cell(s) from the $N_{cells,0}^{DL,\mu} + N_{cells,1}^{DL,\mu}$ downlink cells. |

Referring to Table 8, when only per-slot monitoring is configured for all cell(s) configured for the UE and when $$N\_dl <= N\_cap\left(\text{e.g., } \sum_{\mu=0}^{3}(N_{cells,0}^{DL,\mu} + \gamma \cdot N_{cells,1}^{DL,\mu}) \le N_{cells}^{cap}\right),$$

the UE may perform PDCCH monitoring up to the BD/CCE limit (e.g., $M^{max,slot,u}_{PDCCH}$, $\gamma$*$M^{max,slot,u}_{PDCCH}$, $C^{max,slot,u}_{PDCCH}$, and/or $\gamma$*$C^{max,slot,u}_{PDCCH}$) configured/defined per slot for each serving. In contrast, when only per-slot monitoring is configured for all cell(s) configured for the UE and when N_dl>N_cap, the UE is not required to monitor PDCCH candidates or non-overlapping CCEs that exceed the BD/CCE limit (e.g., $M^{total,slot,u}_{PDCCH}$ and/or $C^{total,slot,u}_{PDCCH}$) computed per slot and per SCS configuration u on active DL/DWP(s) of scheduling cell(s).

(Case-2) When only per-span monitoring is configured for all cell(s) configured for the UE, the UE operates as shown in the following table depending on a situation in which N_dl<=N_cap or N_dl>N_cap using $N^{cap\text{-}r16}_{cells}$ which may be determined based on the UE capability signal pdcch-BlindDetectionCA. The following table is an excerpt from Clause 10.1 of 3GPP TS 38.213.

TABLE 9

Table 10.1-2A: Maximum number $M_{PDCCH}^{max,(X,Y),\mu}$ of monitored PDDCH candidates in a span for combination (X, Y) for a DL BWP with SCS configuration μ ∈ {0, 1} for a single serving cell

| | Maximum number $M_{PDCCH}^{max,(X,Y),\mu}$ of monitored PDCCH candidates per span for combination (X, Y) and per serving cell | | |
|---|---|---|---|
| μ | (2, 2) | (4, 3) | (7, 3) |
| 0 | 14 | 28 | 44 |
| 1 | 12 | 24 | 36 |

Table 10.1-3A: Maximum number $C_{PDCCH}^{max,(X,Y),\mu}$ of non−overlapped CCEs in a span for combination (X, Y) for a DL BWP with SCS configuration μ ∈ {0, 1} for a single serving cell

| | Maximum number $C_{PDCCH}^{max,(X,Y),\mu}$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

TABLE 9-continued

If a UE is configured with $N_{cells,r16}^{DL,\mu}$ downlink cells for which the UE is provided monitoringCapabilityConfig = r16monitoringcapability and with associated PDCCH candidates monitored in the active DL BWPs of the scheduling cells using SCS configuration μ, and with $N_{cells,r16}^{DL,(X,Y),\mu}$ of the $N_{cells,r16}^{DL,\mu}$ downlink cells using combination (X, Y) for PDCCH monitoring, where $\sum_{\mu=0}^{1} N_{cells,r16}^{DL,\mu} \leq N_{cells}^{cap-r16}$, the UE is not required to monitor, on the active DL BWP of the scheduling cell, more than $M_{PDCCH}^{total,(X,Y),\mu} = M_{PDCCH}^{max,(X,Y),\mu}$ PDCCH candidates or more than $C_{PDCCH}^{total,(X,Y),\mu} = C_{PDCCH}^{max,(X,Y),\mu}$ non-overlapped CCEs per scan for each scheduled cell when the scheduling cell is from the $N_{cells,r16}^{DL,(X,Y),\mu}$ downlink cells.

If a UE is configured only with $N_{cells,r16}^{DL,\mu}$ downlink cells for which the UE is provided monitoringCapabilityConfig = r16monitoringcapability and with associated PDCCH candidates monitored in the active DL BWPs of the scheduling cells using SCS configuration μ, and with $N_{cells,r16}^{DL,(X,Y),\mu}$ of the $N_{cells,r16}^{DL,\mu}$ downlink cells using combination (X, Y) for PDCCH monitoring, where $\sum_{\mu=0}^{1} N_{cells,r16}^{DL,\mu} > N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $$M_{PDCCH}^{total,(X,Y),\mu} = \left\lfloor N_{cells}^{cap-r16} \cdot M_{PDCCH}^{max,(X,Y),\mu} \cdot N_{cells,r16}^{DL,(X,Y),\mu} / \sum_{j=0}^{1} N_{cells,r16}^{DL,j} \right\rfloor$$

PDCCH candidates or more than $$C_{PDCCH}^{total,(X,Y),\mu} = \left\lfloor N_{cells}^{cap-r16} \cdot C_{PDCCH}^{max,(X,Y),\mu} \cdot N_{cells,}^{DL,(X,Y),\mu} / \sum_{j=0}^{1} N_{cells,r16}^{DL,j} \right\rfloor$$

non-overlapped CCEs per set of spans on the active DL BWP(s) of all scheduling cell(s) from the $N_{cells,r16}^{DL,(X,Y),\mu}$ downlink cells within every X symbols, if the union of PDCCH monitoring occasions on all scheduling cells from the $N_{cells,r16}^{DL,(X,Y),\mu}$ downlink cells result to PDCCH monitoring according to the combination (X, Y) and any pair of spans in the set is within Y symbols, where first X symbols start at a first symbol with a PDCCH monitoring occasion and next X symbols start at a first symbol with a PDCCH monitoring occasion that is not included in the first X symbols TABLE 9-continued

| |
|---|
| per set of spans across the active DL BWP(s) of all scheduling cells from the $N_{cells,r16}^{DL,(X,Y),\mu}$ downlink cells, with at most one span per scheduling cell for each set of spans, otherwise where $N_{cells,r16}^{DL,j}$ is a number of configured cells with associated PDCCH candidates monitored in the active DL BWPs of the scheduling cell using SCS configuration j. |

Referring to Table 9, when only per-span monitoring is configured for all cell(s) configured for the UE and when $$N\_dl <= N\_cap\left(\text{e.g., } \sum_{\mu=0}^{1} N_{cells,r16}^{DL,\mu} \le N_{cells}^{cap-r16}\right),$$

the UE may perform PDCCH monitoring up to the BD/CCE limit (e.g., $M^{max,(X,Y),\mu}_{PDCCH}$, $C^{max,(X,Y),\mu}_{PDCCH}$, and/or $\gamma * C^{max,slot,u}_{PDCCH}$) defined per span for each serving cell. In contrast, when only per-span monitoring is configured for all cell(s) configured for the UE and when N_dl>N_cap, the UE is not required to monitor PDCCH candidates or non-overlapping CCEs that exceed the BD/CCE limits (e.g., $M^{total,(X,Y),u}_{PDCCH}$ and/or $C^{total(X,Y),u}_{PDCCH}$) computed per set of spans and per SCS configuration u on active DL/DWP(s) of scheduling cell(s).

(Case-3) If per-slot monitoring is configured for some of cells configured for the UE and per-span monitoring is configured for other some cells, the BD/CCE limit may be computed by distinguishing between the cells for which per-slot monitoring is configured and cells for which per-span monitoring is configured. For example, specifically, for cell(s) for which per-slot monitoring is configured, $M^{total,slot,u}_{PDCCH}$ and/or $C^{total,slot,u}_{PDCCH}$ for the cell(s) for which per-slot monitoring is configured may be computed using $N^{cap-r16}_{cells,r15}$ which may be determined based on the UE capability signal pdcch-BlindDetectionCA1 instead of $N^{cap}_{cells}$. In contrast, for cell(s) for which per-span monitoring is configured, $M^{total,(X,Y),u}_{PDCCH}$ and/or $C^{total,(X,Y),u}_{PDCCH}$ for the cells for which per-span monitoring is configured may be computed using $N^{cap-r16}_{cells,r16}$ which may be determined based on the UE capability signal pdcch-BlindDetectionCA2 instead of $N^{cap-r16}_{cells}$.

If a cell operating for per-X monitoring forms CA with a cell operating for per-slot and/or per-span monitoring, the number of possible cases further increases, and a capability information element (IE) for determining N_cap should be added, so that the burden on the BS and UE may increase. Hereinbelow, a BD/CCE limit computation (or change/restriction/re-determination), according to some implementations of the disclosure, applicable in various CA situations in which per-slot monitoring, per-span monitoring, and per-X monitoring are mixed, will be described.

* Implementation 1: Method of determining a monitoring capability for per-X monitoring (i.e., multi-slot PDCCH monitoring) and a BD/CCE limit per X slots, with respect to a UE for which CA is configured In an operation for some scenarios (e.g., 3GPP NR Rel-15/16 NR), the UE may determine a BD/CCE limit per slot corresponding to a monitoring capability for per-slot monitoring ($N^{cap}_{cells}$, i.e., the number of DL cells on which per-slot monitoring is capable of being performed). In this case, $N^{cap}_{cells}$ may be determined as this value when the UE provides/reports pdcch-BlindDetectionCA, and otherwise, $N^{cap}_{cells}$ may be determined from the number of DL cells for which per-slot monitoring is configured. Further, the UE may determine a BD/CCE limit per span corresponding to a monitoring capability for per-span monitoring ($N^{cap-r16}_{cells}$, i.e., the number of DL cells on which per-span monitoring is capable of being performed). In this case, $N^{cap-r16}_{cells}$ may be determined as this value when the UE provides/reports pdcch-MonitoringCA (or pdcch-MonitoringCA-r16) to the BS, and otherwise, $N^{cap-r16}_{cells}$ may be determined from the number of DL cells for which per-span is configured.

For per-X monitoring introduced in NR Rel-17, the monitoring capability for per-X monitoring and/or the BD/CCE limit per X slots may be determined by one of the following two methods.

** Implementation 1-1) The UE may determine the BD/CCE limit per X slots corresponding to a monitoring capability $N^{cap-r17}_{cells}$ for per-X monitoring. In Implementation 1-1, $N^{cap-r17}_{cells}$ means N_cap for per-X monitoring, indicating the number of DL cells on which per-X monitoring is capable of being performed. In some implementations, $N^{cap-r17}_{cells}$ may be determined by this value if the UE provides/reports pdcch-MonitoringCA-r17 to the BS, and otherwise, may be determined from the number of DL cells for which per-X monitoring is configured. In the disclosure, (tentative name) pdcch-MonitoringCA-r17 is a newly-defined UE capability IE, indicating the number of DL cells on which monitoring is capable of being performed with a maximum BD/CCE limit for all serving cells in a CA situation.

** Implementation 1-2) The UE may determine a monitoring capability for per-slot monitoring and per-X monitoring, i.e., the number of DL cells on which per-slot monitoring or per-X monitoring is capable of being performed, as one monitoring capability $N^{cap-r17}_{cells}$ and determine a BD/CCE limit per X slots (where X may be 1 or more than 1) corresponding to this monitoring capability. In Implementation 1-2, $N^{cap-r17}_{cells}$ means N_cap for per-slot and/or per-X monitoring, indicating the number of DL cells on which per-slot monitoring and/or per-X monitoring is capable of being performed. Alternatively, if the meaning of $N^{cap}_{cells}$ representing the number of DL cells for existing per-slot monitoring is changed to include the number of DL cells for per-X monitoring, $N^{cap}_{cells}$ may be used as a symbol indicating $N^{cap-r17}_{cells}$ of Implementation 1-2. In some implementations, $N^{cap-r17}_{cells}$ may be determined from the capability IE value reported by the UE, and if the capability IE value is not provided/reported, $N^{cap-r17}_{cells}$ may be determined from the sum of the number of DL cells for per-slot monitoring and/or the number of DL cells for per-X monitoring, configured for the UE. For example, in a CA situation in which 120-kHz cell(s) and 480-KHz cell(s) are configured, the UE may determine $N^{cap-r17}_{cells}$ from the number of 120-kHz cells on which per-slot monitoring is capable of being performed and the number of 480-kHz cells on which per-X monitoring is capable of being performed. The BD/CCE limit corresponding to $N^{cap-r17}_{cells}$ may be a 1-slot unit for 120 kHz and an X-slot unit for 480 kHz. To determine $N^{cap-r17}_{cells}$ mentioned above, the UE may report capability using a different capability IE for per-slot monitoring or per-X monitoring (in this case, $N^{cap-r17}_{cells}$ may be determined from the sum of two IE values) or simultaneously report the number of cells on which per-slot monitoring or per-X monitoring is capable of being performed using one IE.

Additionally, N_cap value(s) described above may basically have different values for respective UEs. The above-mentioned N_cap value(s) may be defined/configured for each serving cell (e.g., scheduling cell) or may be defined/configured for each BWP (e.g., active DL BWP) of a corresponding cell.

* Implementation 2) A BD/CCE limit computation and monitoring method for each cell (or for each SCS) when the monitoring capabilities of per-X monitoring and per-slot monitoring are defined as one with respect to the UE for which CA is configured When the monitoring capabilities of per-slot monitoring and per-X monitoring (hereinafter referred to as $N^{cap-r17}_{cells}$) are defined as one through the method(s) of Implementation 1, a monitoring operation may be specified according to relative sizes of N_dl and N_cap.

For example, N_dl<=N_cap may be expressed as follows.

Equation 1

$$\sum_{\mu=0}^{3}\left(N_{cells,0}^{DL,u}+\gamma\cdot N_{cells,1}^{DL,u}\right)+\sum_{\mu=5}^{6}\left(N_{cells,0}^{DL,u}+\gamma\cdot N_{cells,1}^{DL,u}\right)\leq N_{cells}^{cap-r17}$$

In this situation, a BD limit per slot and a CCE limit per slot (e.g., $M^{total,slot,u}_{PDCCH}=M^{max,slot,u}_{PDCCH}$ (or $M^{total,slot,u}_{PDCCH}=\gamma^{*}M^{max,slot,u}_{PDCCH}$) and $C^{total,slot,u}_{PDCCH}=C^{max,slot,u}_{PDCCH}$ (or $C^{total,slot,u}_{PDCCH}=\gamma^{*}C^{max,slot,u}_{PDCCH}$, respectively, as defined in the specification of 38.213) may be applied to an SCS (e.g., u=0, 1, 2, or 3) for which per-slot monitoring is configured. A BD limit per X slots and a CCE limit per X slots may be applied to an SCS (e.g., u=5 or 6) for which per-X monitoring is configured. In this case, the UE does not need to perform BD and CCE exceeding a corresponding BD/CCE limit per SCS in an active DL BWP of a scheduling cell.

If N_dl>N_cap, in some implementations, the number of cells on which PDCCH is monitored (or BD/CCE limit) for each SCS may be recomputed (or restricted) as follows.

Equation 2

$$M_{PDCCH}^{total,X,u}=\left\lfloor N_{cells}^{cap-r17}\cdot M_{PDCCH}^{max,X,u}\cdot\left(N_{cells,0}^{DL,u}+\gamma\cdot N_{cells,1}^{DL,u}\right)/\sum_{j=5}^{6}\left(N_{cells,0}^{DL,j}+\gamma\cdot N_{cells,1}^{DL,j}\right)\right\rfloor$$

-continued $$C_{PDCCH}^{total,X,u}=\left\lfloor N_{cells}^{cap-r17}\cdot C_{PDCCH}^{max,X,u}\cdot\left(N_{cells,0}^{DL,u}+\gamma\cdot N_{cells,1}^{DL,u}\right)/\sum_{j=5}^{6}\left(N_{cells,0}^{DL,j}+\gamma\cdot N_{cells,1}^{DL,j}\right)\right\rfloor$$

In this case, values of $M^{total,X,u}_{PDCCH}$, $M^{max,X,u}_{PDCCH}$, $C^{total,X,u}_{PDCCH}$, and $C^{max,X,u}_{PDCCH}$ mean 1-slot unit values for an SCS (e.g., u=0, 1, 2, or 3) for which per-slot monitoring is configured and X-slot values for an SCS (e.g., u=5 or 6) for which per-X monitoring is configured. In this case, two or more Xs may be configured for the SCS for which per-X monitoring is configured, and different BD/CCE limits may be given for respective Xs. For this SCS, the largest or smallest X may be determined as a reference X. Then a method of computing the BD/CCE limit according to the reference X and applying a scheduling value of the BD/CCE limit (according to a ratio of X to reference X) to per-X monitoring for the other X values may be used. For example, when X=8 and X=4 are configured for a 960-kHz SCS, the BD limit per X=8 is '20', and the BD limit per X=4 is '10', the UE may let X=8 be the reference X and compute the BD/CCE limit by applying '20' to $M^{max,X,u}_{PDCCH}$ used for computation in a situation in which N_dl<N_cap. Next, the UE may apply a value obtained by multiplying ½ by the computed BD/CCE limit to per-X monitoring for X=4. If the value obtained by multiplying ½ by the BD/CCE limit value computed by applying $M^{max,X,u}_{PDCCH}=20$ is not an integer, an integer value obtained by computing floor( ) of the non-integer value may be applied to per-X monitoring for X=4. Conversely, the UE may let X=4 be the reference X and compute the BD/CCE limit by applying '10' to $M^{max,X,u}_{PDCCH}$. Next, the UE may apply a value obtained by multiplying 2 by the computed BD/CCE limit to per-X monitoring for X=8. Finally, a method of determining the BD/CCE limit for each of a plurality of Xs configured for a corresponding SCS may be used. For example, in the above examples, $M^{total,X,u}_{PDCCH}$ for X=8 and $M^{total,X,u}_{PDCCH}$ for X=4 may be separately computed. In this case, when the number of cells configured for each X is different, the number may be may be applied to BD/CCE limit computation as follows.

Equation 3

$$M_{PDCCH}^{total,X=8,u}=\left\lfloor N_{cells}^{cap-r17}\cdot M_{PDCCH}^{max,X=8,u}\cdot\left(N_{cells,0}^{DL,X=8,u}+\gamma\cdot N_{cells,1}^{DL,X=8,u}\right)/\sum_{j=5}^{6}\left(N_{cells,0}^{DL,j}+\gamma\cdot N_{cells,1}^{DL,j}\right)\right\rfloor$$

$$M_{PDCCH}^{total,X=4,u}=\left\lfloor N_{cells}^{cap-r17}\cdot M_{PDCCH}^{max,X=4,u}\cdot\left(N_{cells,0}^{DL,X=4,u}+\gamma\cdot N_{cells,1}^{DL,X=4,u}\right)/\sum_{j=5}^{6}\left(N_{cells,0}^{DL,j}+\gamma\cdot N_{cells,1}^{DL,j}\right)\right\rfloor$$

As described above, if monitoring capabilities for per-slot monitoring and per-X monitoring (e.g., the number of DL cells on which per-slot or per-X monitoring is capable of being performed) are managed as one budget, the number of per-slot monitoring cells and the number of per-X monitoring cells may be flexibly distributed in a situation in which N_dl>N_cap. If the capability for per-slot monitoring and the capability for per-X monitoring are respectively defined and are managed as a separate budget, flexibility when the BD/CCE limit is redetermined/restricted in the situation in which N_dl>N_cap may be reduced.

Figure 5:
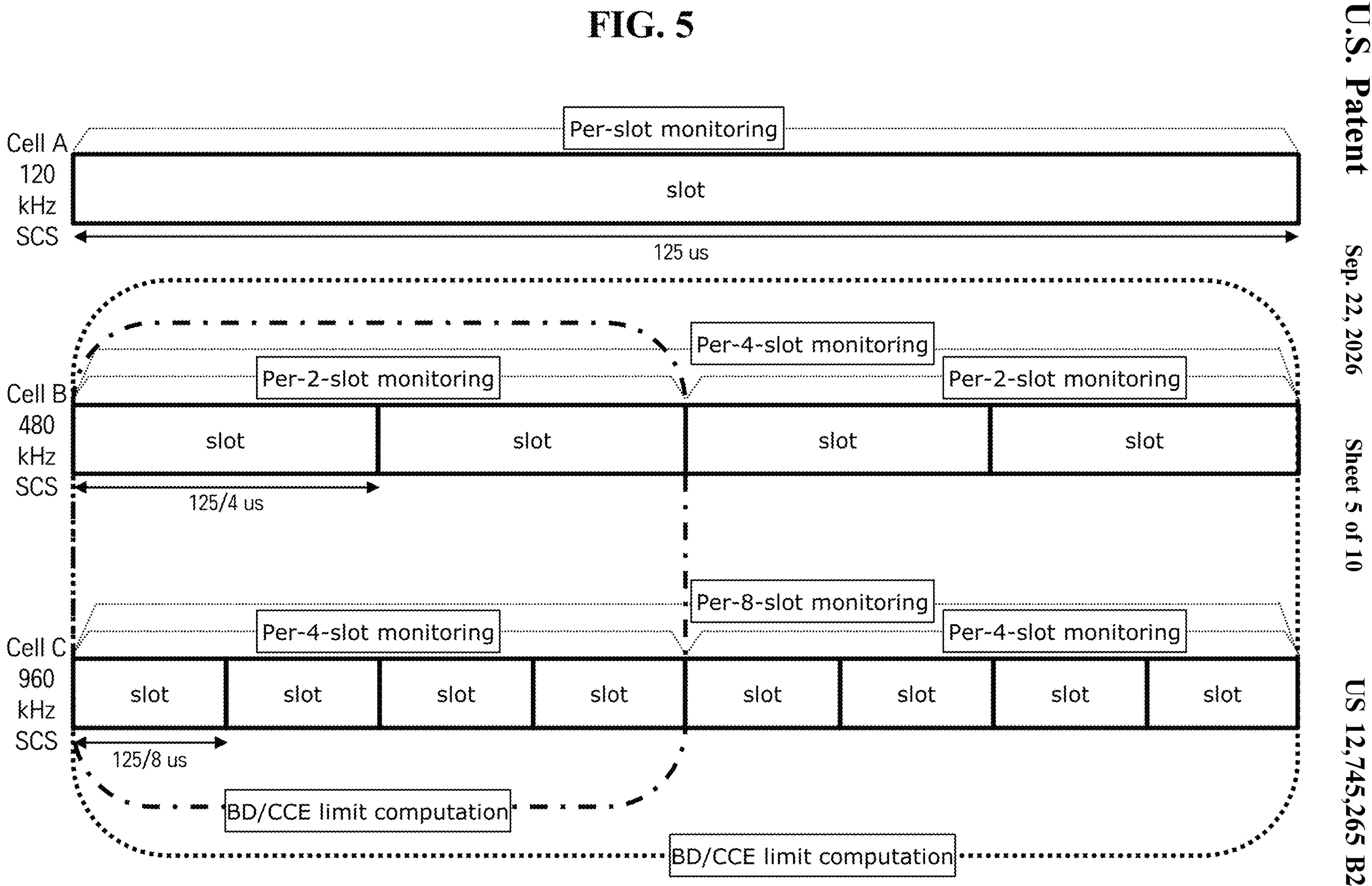
Figure 6:
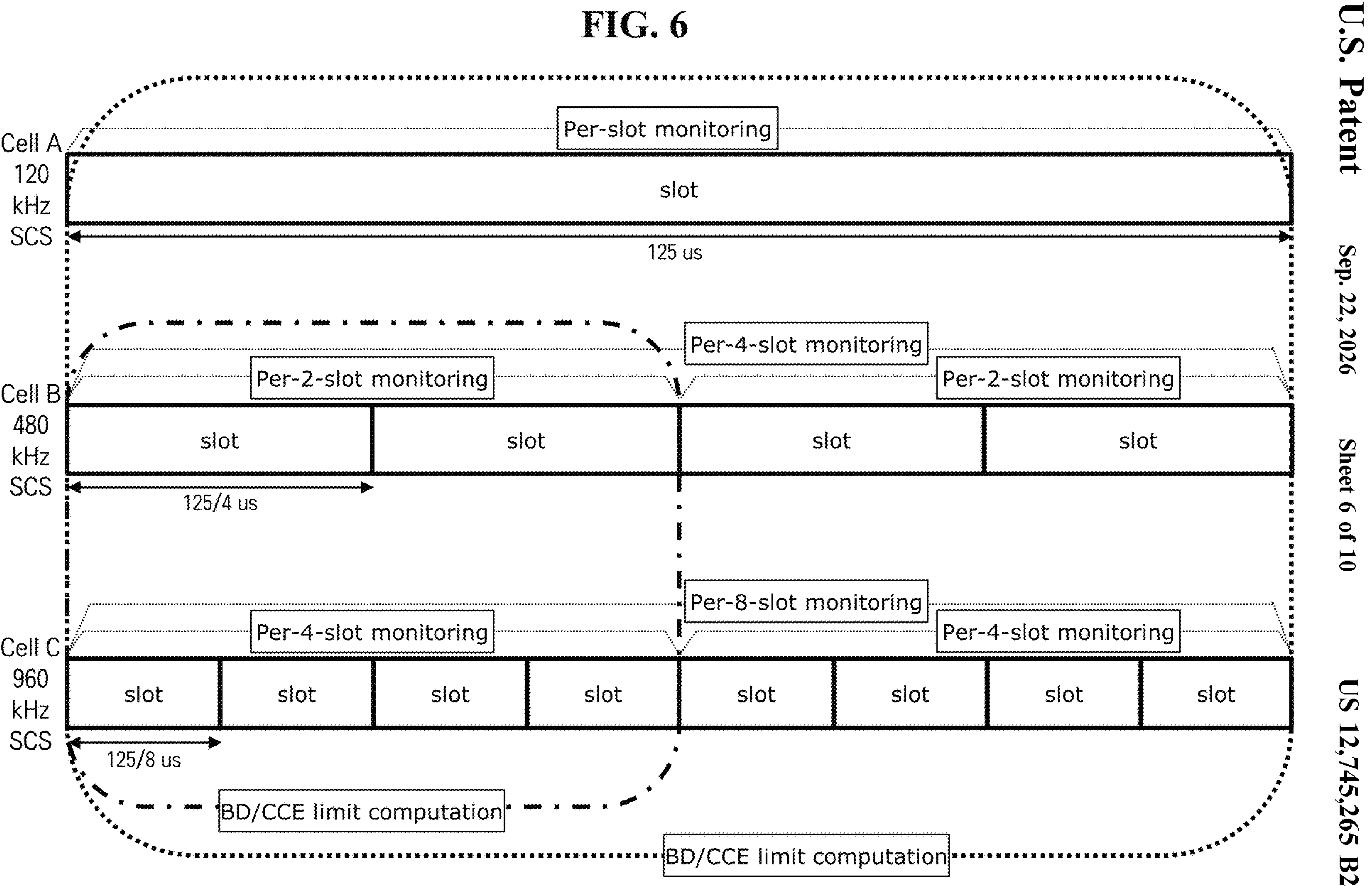

* Implementation 3: Method of configuring/determining the monitoring capability and/or the BD/CCE limit, per time unit, with respect to the UE for which CA is configured FIGS. 4 to 6 are diagrams for explaining a BD and/or CCE limit according to some implementations of the present disclosure.

When a BD/CCE limit is computed/restricted with respect to the UE for which CA is configured in a situation in which N_dl>N_cap, the monitoring capability and/or the BD/CCE limit may be determined for each time unit. In this case, the time unit may mean absolute time. For example, all of one 120-kHz slot, eight 960-kHz slots (i.e., when X=8), and four 480-kHz slots (i.e., when X=4) have the same absolute time. In Implementation 3, cells on which PDCCH monitoring is performed in the same absolute time unit may share one monitoring capability, and the UE may compute one BD/CCE limit in the situation in which N_dl>N_cap, so that a BD/CCE budget may be flexibly shared between the cells. For example, referring to FIG. 4, if a 480-kHz cell (cell B in FIG. 4) and a 960-kHz cell (cell C in FIG. 4) for per-X monitoring are configured for the UE, and if per-X monitoring of X=2 and X=4 for the 480-kHz cell and per-X monitoring of X=4 and X=8 for the 960-kHz cell are all configured, the UE may define or compute a monitoring capability and/or a BD/CCE limit for a total of two time units in a situation in which N_dl>N_cap. According to Implementation 3, the BD/CCE limit may be computed for each basic time length of PDCCH monitoring. For example, for cells for which per-X monitoring is configured (and cell(s) on which per-slot monitoring is performed), the UE is not required to monitor more PDCCH candidates than $M^{total,time\text{-}unit}{}_{PDCCH}$ or more non-overlapping CCEs than $C^{total,time\text{-}unit}{}_{PDCCH}$, in each PDCCH monitoring time unit. Herein, "time unit" may be a basic time unit in which the UE performs PDCCH monitoring. For example, the BD/CCE limit may be computed as follows.

Equation 4

$$M_{PDCCH}^{total,time-unti} = \left\lfloor N_{cells}^{cap-r17} \cdot M_{PDCCH}^{max,time-unit} \cdot \left(N_{cells,0}^{DL,u} + \gamma \cdot N_{cells,1}^{DL,u}\right) / \sum_{j=0}^{6}\left(N_{cells,0}^{DL,j} + \gamma \cdot N_{cells,1}^{DL,j}\right)\right\rfloor$$

$$C_{PDCCH}^{total,time-unti} = \left\lfloor N_{cells}^{cap-r17} \cdot C_{PDCCH}^{max,time-unit} \cdot \left(N_{cells,0}^{DL,u} + \gamma \cdot N_{cells,1}^{DL,u}\right) / \sum_{j=0}^{6}\left(N_{cells,0}^{DL,j} + \gamma \cdot N_{cells,1}^{DL,j}\right)\right\rfloor$$

If cell(s) on which the UE performs per-slot monitoring and cell(s) on which the UE performs per-X monitoring are configured for the UE, a monitoring capability and/or a BD/CCE limit may be computed for each time unit, (i.e., a monitoring capability and/or a BD/CCE limit, in each basic time length) using one of the following two methods.

Method 3-1) The monitoring capability and/or the BD/CCE limit may be determined for each time unit (i.e., for each cell/SCS on which the UE performs PDCCH monitoring in the same absolute time unit) only for cells on which the UE performs per-X monitoring. For example, referring to FIG. 5, if a 120-kHz cell (cell A in FIG. 5) on which the UE performs per-slot monitoring, and a 480-kHz cell (cell B in FIG. 5) and a 960-kHz cell (cell C in FIG. 5) on which the UE performs per-X monitoring are configured with respect to the UE for which CA is configured, per-X monitoring of X=2 and X=4 is configured for the 480-kHz cell, and per-X monitoring of X=4 and X=8 is configured for the 960-kHz cell, the UE may define or compute monitoring capabilities and/or BD/CCE limits for a total of three time units in a situation in which N_dl>N_cap. Referring to FIG. 5**, the UE may compute monitoring capabilities and BD/CCE limits for X=2 for the 480-kHz cell and X=4 for the 960-kHz cell, and separately compute monitoring capacities and BD/CCE limits for X=4 for the 480-kHz cell and X=8 for the 960-kHz cell. In this case, in Method 3-1, since the 120-kHz cell does not operate for per-X monitoring, the monitoring capability and BD/CCE limits for the 120-kHz cell are separately computed.

Method 3-2) The monitoring capability and/or the BD/CCE limit may be determined for each time unit (i.e., for each cell/SCS on which the UE performs PDCCH monitoring in the same absolute time unit) for all of cell(s) on which the UE performs per-slot monitoring and cell(s) on which the UE performs per-X monitoring. For example, referring to FIG. 6, if a 120-kHz cell (cell A in FIG. 6) on which the UE performs per-slot monitoring, and a 480-kHz cell (cell B in FIG. 6) and a 960-kHz cell (cell C in FIG. 6) on which the UE performs per-X monitoring are configured with respect to the UE for which CA is configured, per-X monitoring of X=2 and X=4 is configured for the 480-kHz cell, and per-X monitoring of X=4 and X=8 is configured for the 960-kHz cell, the UE may define or compute monitoring capabilities and/or BD/CCE limits for a total of two time units in a situation in which N_dl>N_cap. Referring to FIG. 6**, the UE may compute monitoring capabilities and BD/CCE limits for X=2 for the 480-kHz cell and X=4 for the 960-kHz cell, and separately compute monitoring capacities and BD/CCE limits for X=4 for the 480-kHz cell, X=8 for the 960-kHz cell, and the 120-kHz cell. According to Method 3-2, since the 120-kHz cell also has the same (monitoring) time unit as X=4 for the 480-kHz cell (or X=8 for the 960-kHz), the monitoring capability and BD/CCE limits for the 120-kHz cell are not separately computed.

Additionally, an absolute time of X=2 for 480 kHz and an absolute time of X=4 for 960 kHz are aligned with half of one slot of 120 kHz. Therefore, it is considered that per-X monitoring with X=2 for a 480 kHz cell and per-X monitoring with X=4 for 960 kHz have the same time unit as a one-slot length of 240 kHz. For per-X monitoring with X=2 for a 480-kHz cell and per-X monitoring with X=4 for a 960-kHz cell (even when a 240-kHz SCS is not configured for PDCCH monitoring), u=4 may be configured when computing the BD/CCE limit for each SCS in a situation in which N_dl>N_cap. For example, in an equation for recomputing the BD limit as shown below, u=4 may be determined to be a time unit corresponding to X=2 for 480 kHz and X=4 for 960 KHz.

Equation 5

$$M_{PDCCH}^{total,u=4} = \left\lfloor N_{cells}^{cap-r17} \cdot M_{PDCCH}^{max,u=4} \cdot \left(N_{cells,0}^{DL,u=4} + \gamma \cdot N_{cells,1}^{DL,u=4}\right) / \sum_{j=5}^{6}\left(N_{cells,0}^{DL,j} + \gamma \cdot N_{cells,1}^{DL,j}\right)\right\rfloor$$

That is, referring to Equation 5, a time unit corresponding to one slot of 240 kHz may be used for BD/CCE computation in the methods of Implementation 3.

In addition, through the methods of Implementation 2, the monitoring capability and BD/CCE limit of per-X monitoring are computed with respect to the UE for which multiple X values for per-X monitoring are configured, and when a budget for a corresponding SCS is distributed to each SCS again, a separate BD/CCE limit may be determined by classifying X=2 for 480 kHz (or X=4 for 960 kHz) as a 240-kHz SCS.

The implementations/methods of the present disclosure are not limited only to transmission and reception of uplink and/or downlink signals. For example, the content of the present disclosure may be used in direct communication between UEs. In addition, a BS in the present disclosure may be a concept including a relay node as well as a BS. For example, an operation of the BS in the present disclosure may be performed by the BS, but may also be performed by the relay node.

Since examples of the above-described proposed method may also be included as one of the implementation methods of the present disclosure, it is obvious that the examples may be regarded as a kind of proposed method. In addition, the above-described proposed methods may be implemented independently, but may also be implemented in the form of a combination (or merge) of some of the proposed methods. Rules may be defined in such a way that information on whether the proposed methods are applied (or information on the rules of the proposed methods) is informed by the BS to the UE or by a transmitting UE to a receiving UE through a predefined signal (e.g., a physical layer signal or a higher layer signal).

In some scenarios as described above (e.g., 3GPP NR Rel-16), BD limits (e.g., $M^{total,slot,u}$PDCCH and $M^{total,(X,Y),u}_{PDCCH}$) and CCE limits (e.g., $C^{total,slot,u}_{PDCCH}$ and $C^{total,(X,Y),u}_{PDCCH}$) are computed with respect to each SCS. When the BD limits and the CCE limits are computed for each SCS in this way, it is difficult to properly determine the BD/CCE limits for multi-slot PDCCH monitoring in which a monitoring time unit may vary for the same SCS. According to some implementations of the disclosure, there is an advantage that the BD/CCE limits of the UE for which multi-slot PDCCH monitoring and CA are configured may be appropriately determined.

According to some implementations of the present disclosure, the BS may expect appropriate operation in a cell supporting multi-slot monitoring for each situation of a DL control channel and/or a data channel and in a CA situation including such a cell.

Figure 7:
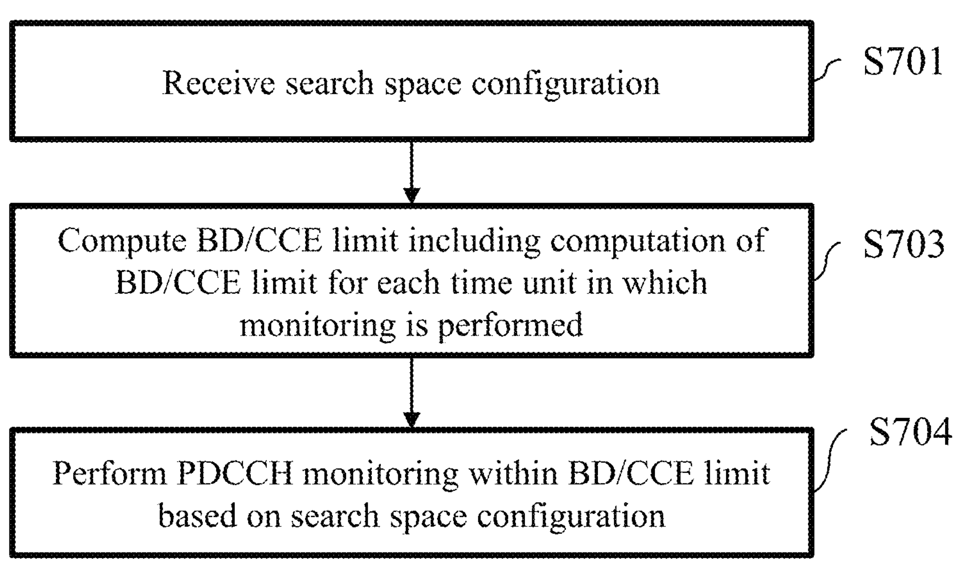
Figure 8:
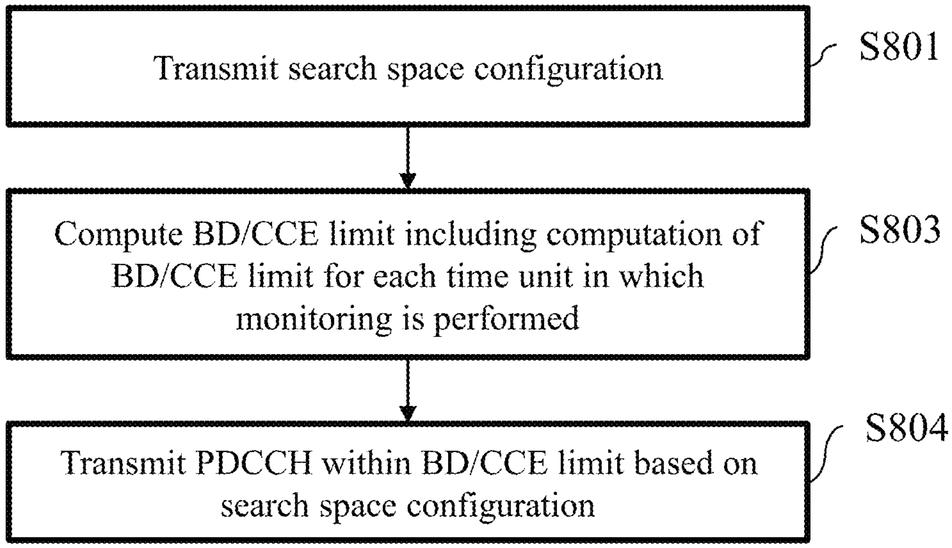

FIGS. 7 and 8 are flowcharts of signal transmission and reception methods according to an embodiment of the present disclosure. In particular, FIG. 7 illustrates a signal transmission and reception flow in the UE, and FIG. 8 illustrates a signal transmission and reception flow in the BS.

Referring to FIG. 7, implementation(s) of the present disclosure may be performed by the UE and include receiving an SS configuration (i.e., an SS set configuration) (S701), computing a BD/CCE limit (S703), and monitoring a PDCCH based on the configuration and the BD/CCE limit (S704). Referring to FIG. 8, the implementation(s) of the present disclosure may be performed by the BS and include transmitting an SS configuration (i.e., an SS set configuration) (S801), computing a BD/CCE limit of the UE (S803), and transmitting a PDCCH based on the configuration and the BD/CCE limit to the UE (S804). In FIG. 7 and/or FIG. 8, computation of the BD/CCE limit may include computing the BD/CCE limit for each time unit in which the UE performs PDCCH monitoring. The UE is not required to monitor PDCCH candidates or CCEs exceeding the BD/CCE limit per time unit. Therefore, the UE may monitor PDCCH candidates and non-overlapping CCEs only within the BD/CCE limit per time unit of PDCCH monitoring. The BS may transmit PDCCH(s) to the UE within PDCCH candidates and non-overlapping CCEs that do not exceed the BD/CCE limit of the UE per time unit of PDCCH monitoring of the UE.

In addition to the operation of FIG. 7 or FIG. 8, one or more of the operations described in Clause 1 may be further performed by the UE or the BS.

According to Clause 1, multi-slot PDCCH monitoring in which only some consecutive slots in each of one or more consecutive slot-groups, each of which consists of a plurality of consecutive slots, are monitored may be performed by the UE.

Referring to FIG. 7 or FIG. 8, the BS may transmit the SS configuration (i.e., also referred to as the SS set configuration) for a BWP of a cell to the UE. The BS may transmit PDCCH(s) on the BWP based on the configuration, and the UE may perform PDCCH monitoring on the BWP based on the configuration.

According to some implementations of the present disclosure, a method by a UE, or operations performed by execution of instruction(s) stored in at least one memory or a storage medium of the UE or a processing device may include: receiving search space configurations for a plurality of DL cells including a first set of DL cells; and performing PDCCH monitoring on the plurality of DL cells based on the search space configurations. Each of the first set of DL cells includes a search space with a multi-slot PDCCH monitoring-related configuration. The PDCCH monitoring is performed in units of slot-groups for a search space with an associated multi-slot PDCCH monitoring-related configuration. The PDCCH monitoring is performed within M PDCCH candidates and C non-overlapping CCEs on the plurality of DL cells.

According to some implementations of the present disclosure, a method by a BS, or operations performed by execution of instruction(s) stored in at least one memory or a non-transitory storage medium of the BS or a processing device may include: transmitting search space configurations for a plurality of DL cells including a first set of DL cells to a UE; and transmitting at least one PDCCH to the UE on the plurality of DL cells based on the search space configurations. Each of the first set of DL cells includes a search space with a multi-slot PDCCH monitoring-related configuration. The at least one PDCCH is transmitted in units of slot-groups for a search space with an associated multi-slot PDCCH monitoring-related configuration. In some implementations, the at least one PDCCH is transmitted within M PDCCH candidates and C non-overlapping CCEs on the plurality of DL cells.

In some implementations, M and C may be computed for each time unit in which the PDCCH monitoring is performed (refer to Implementation 3).

In some implementations, M and C may be computed for each time unit for the first set of DL cells excluding a second set of DL cells with no associated multi-slot PDCCH monitoring-related configuration among the plurality of DL cells (refer to Method 3-1 of Implementation 3).

In some implementations, M and C may be computed for each time unit for the plurality of DL cells including a second set of DL cells with no associated multi-slot PDCCH monitoring-related configuration (refer to Method 3-2 of Implementation 3).

In some implementations, M and C may be computed based on the number of DL cells on which the UE is configured to perform monitoring exceeding a total number of DL cells on which the UE is capable of performing monitoring.

In some implementations, the multi-slot PDCCH monitoring-related configuration may be provided for a cell with an SCS of 480 kHz or a cell with an SCS of 960 KHz.

In addition to the operation(s) described in relation to FIG. 7 or FIG. 8, one or more of the operations described in FIG. 1 to FIG. 6 and/or the operations described in Clause 1 may be additionally performed in combination.

Example of Communication System to which Implementations/Embodiments of the Present Disclosure is Applied The various descriptions, functions, procedures, proposals, methods, and/or operation flowcharts herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 9 illustrates a communication system 1 applied to the present disclosure.

Referring to FIG. 9, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g., V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 10:
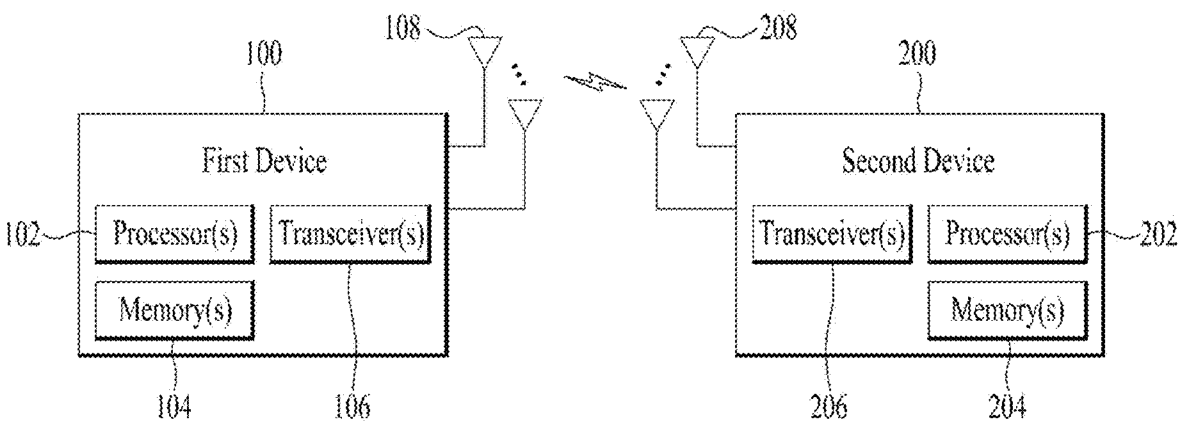
FIG. 10 illustrates wireless devices applicable to the present disclosure.

FIG. 10 illustrates wireless devices applicable to the present disclosure.

Referring to FIG. 10, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 9.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 11:
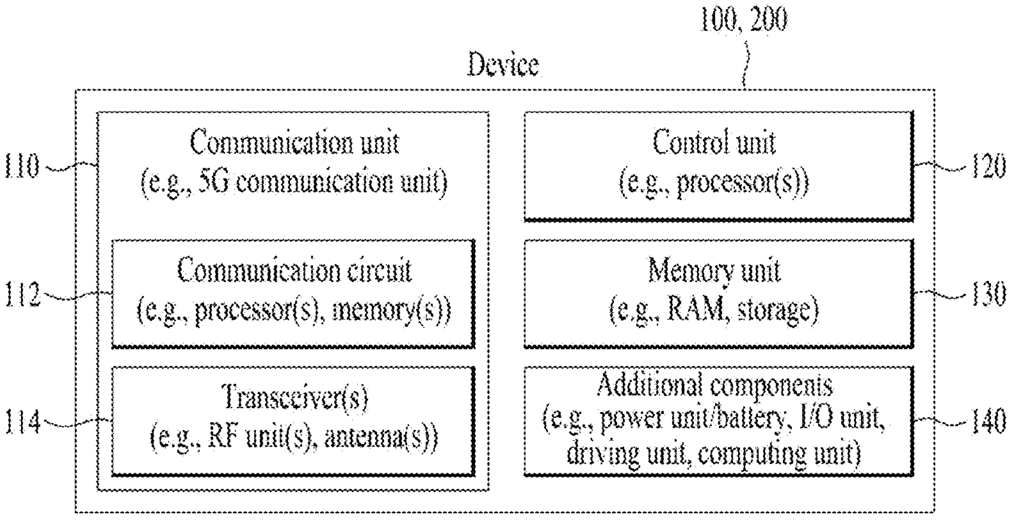
FIG. 11 illustrates another example of a wireless device applied to the present disclosure.

FIG. 11 illustrates another example of a wireless device applied to the present disclosure. The wireless device may be implemented in various forms according to a use case/service (refer to FIG. 9).

Referring to FIG. 11, wireless devices 100 and 200 may correspond to the wireless devices 100 and 200 of FIG. 10 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 10. For example, the transceiver(s) 114 may include the one or more transceivers 106 and 206 and/or the one or more antennas 108 and 208 of FIG. 10. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 9), the vehicles (100*b*-1 and 100*b*-2 of FIG. 9), the XR device (100*c* of FIG. 9), the hand-held device (100*d* of FIG. 9), the home appliance (100*e* of FIG. 9), the IoT device (100*f* of FIG. 9), a digital broadcasting terminal, a hologram device, a public safety device, an MTC device, a medical device, a FinTech device (or a finance device), a security device, a climate/environment device, the AI server/device (400 of FIG. 9), the BSs (200 of FIG. 9), a network node, or the like. The wireless device may be mobile or fixed according to a use case/service.

In FIG. 9, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 12 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 12, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 10, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

The invention claimed is:

1. A method of monitoring a control channel by a user equipment (UE) in a wireless communication system, the method comprising:

receiving search space configurations for a plurality of downlink (DL) cells including a first set of DL cells; and performing physical downlink control channel (PDCCH) monitoring on the plurality of DL cells based on the search space configurations, wherein each of the first set of DL cells includes a search space with a multi-slot PDCCH monitoring-related configuration, wherein the PDCCH monitoring is performed in units of slot-groups for a search space with an associated multi-slot PDCCH monitoring-related configuration, wherein the PDCCH monitoring is performed within M PDCCH candidates and C non-overlapping control channel elements (CCEs) on the plurality of DL cells, and wherein M and C are computed for each time unit in which the PDCCH monitoring is performed.

2. The method of claim 1, wherein M and C are computed for each time unit for the first set of DL cells excluding a second set of DL cells with no associated multi-slot PDCCH monitoring-related configuration among the plurality of DL cells.

3. The method of claim 1, wherein M and C are computed for each time unit for the plurality of DL cells including a second set of DL cells with no associated multi-slot PDCCH monitoring-related configuration.

4. The method of claim 1, wherein M and C are computed based on the number of DL cells on which the UE is configured to perform monitoring exceeding a total number of DL cells on which the UE is capable of performing monitoring.

5. The method of claim 1, wherein the multi-slot PDCCH monitoring-related configuration is provided for a cell with a subcarrier spacing (SCS) of 480 kHz or a cell with an SCS of 960 kHz.

6. An apparatus for a user equipment (UE), the apparatus comprising:

at least one processor; and at least one computer memory operably connected to the at least one processor and storing instructions that, when executed, cause the at least one processor to perform operations, wherein the operations comprise:

receiving search space configurations for a plurality of downlink (DL) cells including a first set of DL cells; and performing physical downlink control channel (PDCCH) monitoring on the plurality of DL cells based on the search space configurations, wherein each of the first set of DL cells includes a search space with a multi-slot PDCCH monitoring-related configuration, wherein the PDCCH monitoring is performed in units of slot-groups for a search space with an associated multi-slot PDCCH monitoring-related configuration, wherein the PDCCH monitoring is performed within M PDCCH candidates and C non-overlapping control channel elements (CCEs) on the plurality of DL cells, and wherein M and C are computed for each time unit in which the PDCCH monitoring is performed.

7. A base station (BS) for transmitting a control channel in a wireless communication system, the BS comprising:

at least one transceiver;

at least one processor; and at least one memory operably connected to the at least one processor and configured to store instructions that, when executed, cause the at least one processor to perform operations, wherein the operations comprise:

transmitting search space configurations for a plurality of downlink (DL) cells including a first set of DL cells to a user equipment (UE); and transmitting at least one physical downlink control channel (PDCCH) to the UE on the plurality of DL cells based on the search space configurations, wherein each of the first set of DL cells includes a search space with a multi-slot PDCCH monitoring-related configuration, wherein the at least one PDCCH is transmitted in units of slot-groups for a search space with an associated multi-slot PDCCH monitoring-related configuration, wherein the at least one PDCCH is transmitted within M PDCCH candidates and C non-overlapping control channel elements (CCEs) on the plurality of DL cells, and wherein M and C are computed for each time unit in which the at least one PDCCH is transmitted.

8. The BS of claim 7, wherein M and C are computed for each time unit for the first set of DL cells excluding a second set of DL cells with no associated multi-slot PDCCH monitoring-related configuration among the plurality of DL cells.

9. The BS of claim 7, wherein M and C are computed for each time unit for the plurality of DL cells including a second set of DL cells with no associated multi-slot PDCCH monitoring-related configuration.

10. The BS of claim 7, wherein M and C are computed based on the number of DL cells on which the UE is configured to perform monitoring exceeding a total number of DL cells on which the UE is capable of performing monitoring.

11. The BS of claim 7, wherein the multi-slot PDCCH monitoring-related configuration is provided for a cell with a subcarrier spacing (SCS) of 480 kHz or a cell with an SCS of 960 kHz.

* * * * *